(12) United States Patent
Seo et al.

(10) Patent No.: US 11,711,129 B2
(45) Date of Patent: *Jul. 25, 2023

(54) METHOD FOR REPORTING CHANNEL STATE INFORMATION IN WIRELESS COMMUNICATION SYSTEM AND DEVICE THEREFOR

(71) Applicant: LG Electronics Inc., Seoul (KR)

(72) Inventors: Inkwon Seo, Seoul (KR); Yunjung Yi, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/492,121

(22) Filed: Oct. 1, 2021

(65) Prior Publication Data

US 2022/0021433 A1 Jan. 20, 2022

Related U.S. Application Data

(63) Continuation of application No. 16/497,107, filed as application No. PCT/KR2018/003198 on Mar. 20, 2018, now Pat. No. 11,152,993.

(Continued)

(51) Int. Cl.
*H04B 7/06* (2006.01)
*H04B 17/336* (2015.01)
(Continued)

(52) U.S. Cl.
CPC ......... *H04B 7/0626* (2013.01); *H04B 7/0639* (2013.01); *H04B 17/336* (2015.01);
(Continued)

(58) Field of Classification Search
CPC .. H04B 7/0626; H04B 7/0639; H04B 17/336; H04B 7/0456; H04B 7/0689;
(Continued)

(56) References Cited

U.S. PATENT DOCUMENTS

2014/0073336 A1 3/2014 Kang
2015/0043469 A1* 2/2015 Kim ...................... H04B 7/024
370/329

(Continued)

OTHER PUBLICATIONS

International Search Report and Written Opinion in International Appln. No. PCT/KR2018/003198, dated Jul. 4, 2018, 24 pages (with English translation).

(Continued)

*Primary Examiner* — Thai Nguyen
(74) *Attorney, Agent, or Firm* — Fish & Richardson P.C.

(57) ABSTRACT

A method by which a terminal reports channel state information (CSI) in a wireless communication system, according to one embodiment of the present invention, comprises the steps of: measuring interference through an interference measurement resource (IMR) set in a control area; and reporting, to a base station, CSI for the control area on the basis of the result of the interference measurement, wherein the CSI for the control area includes information on quality of a downlink control channel set through at least one control channel element (CCE) aggregation, and the information on the quality of the downlink control channel can include information on at least one CCE aggregation level preferred by the terminal in order to receive the downlink control channel. A UE is capable of communicating with at least one of another UE, a UE related to an autonomous driving vehicle, a base station or a network.

17 Claims, 9 Drawing Sheets

Related U.S. Application Data

(60) Provisional application No. 62/532,999, filed on Jul. 15, 2017, provisional application No. 62/475,891, filed on Mar. 24, 2017.

(51) Int. Cl.
*H04L 1/00* (2006.01)
*H04W 24/10* (2009.01)
*H04W 72/23* (2023.01)
*H04W 72/53* (2023.01)

(52) U.S. Cl.
CPC ........... *H04L 1/0013* (2013.01); *H04W 24/10* (2013.01); *H04W 72/23* (2023.01); *H04W 72/53* (2023.01)

(58) Field of Classification Search
CPC ..... H04B 17/24; H04B 17/345; H04L 1/0013; H04L 5/0044; H04L 1/0046; H04L 5/005; H04L 5/0057; H04L 1/0026; H04L 1/0031; H04L 5/0023; H04L 5/0048; H04L 5/0062; H04L 5/0053; H04W 24/10; H04W 72/042; H04W 72/0493; H04W 72/1268; H04W 72/046; H04J 11/00

See application file for complete search history.

(56) References Cited

U.S. PATENT DOCUMENTS

| | | | |
|---|---|---|---|
| 2015/0098347 A1* | 4/2015 | Guo | H04W 52/243 370/252 |
| 2015/0172022 A1 | 6/2015 | Guo et al. | |
| 2015/0207600 A1* | 7/2015 | Park | H04B 7/024 370/329 |
| 2015/0312920 A1 | 10/2015 | Hu et al. | |
| 2016/0182137 A1* | 6/2016 | Onggosanusi | H04B 7/0469 370/329 |
| 2016/0323901 A1 | 11/2016 | Yum et al. | |
| 2018/0098235 A1* | 4/2018 | Bagheri | H04L 5/0055 |

OTHER PUBLICATIONS

Qualcomm Incorporated, "PDCCH control resource set and search space," R1-1702628, 3GPP TSG RAN WG1 #88, Athens, Greece, dated Feb. 13-17, 2017, 4 pages.

\* cited by examiner

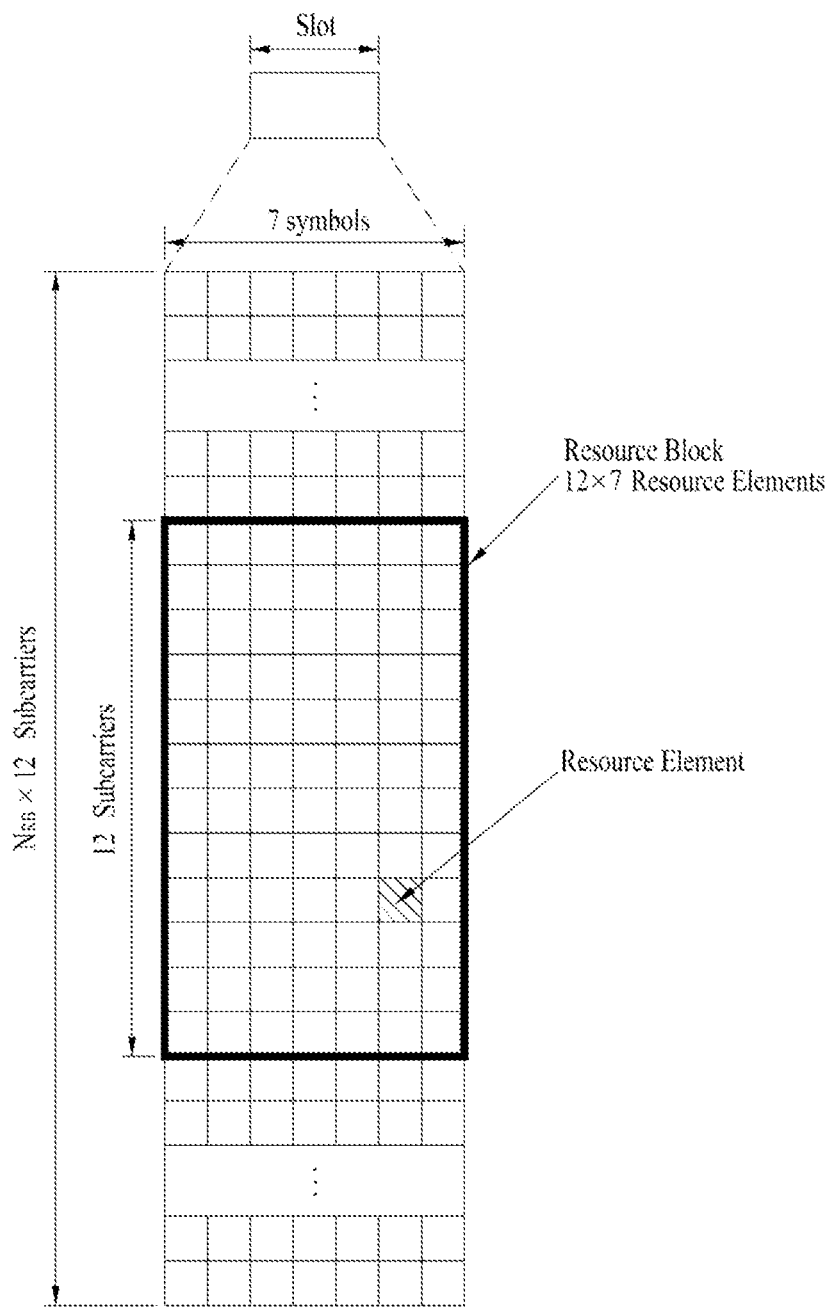

METHOD FOR REPORTING CHANNEL STATE INFORMATION IN WIRELESS COMMUNICATION SYSTEM AND DEVICE THEREFOR

CROSS-REFERENCE TO RELATED APPLICATIONS

This application is a continuation of U.S. application Ser. No. 16/497,107, filed on Sep. 24, 2019, which is a National Stage application under 35 U.S.C. § 371 of International Application No. PCT/KR2018/003198, filed on Mar. 20, 2018, which claims the benefit of U.S. Provisional Application No. 62/532,999, filed on Jul. 15, 2017, and U.S. Provisional Application No. 62/475,891, filed on Mar. 24, 2017. The disclosures of the prior applications are incorporated by reference in their entirety.

TECHNICAL FIELD

The present invention relates to a wireless communication system, and more particularly, to a method for transmitting or receiving channel state information (CSI) for a control region in a wireless communication system and a device therefor.

BACKGROUND

As more communication devices require greater communication capacity, the need of mobile broadband communication more enhanced than the conventional RAT (radio access technology) has been issued in a next generation communication system discussed recently. Also, massive MTC (Machine Type Communications) technology that provides various services anywhere and at any time by connecting a plurality of devices and things is one of main issues which will be considered in next generation communication. Furthermore, considering service/UE susceptible to latency and reliability, URLLC (Ultra-Reliable and Low Latency Communication) has been discussed in a next generation communication system.

As described above, a new RAT considering eMBB, mMTC and URLCC has been discussed for next generation wireless communication.

SUMMARY

An object of the present invention is to provide a method for efficiently and exactly measuring and reporting CSI for a downlink control region in a wireless communication system and a device therefor.

The objects that could be achieved with the present disclosure are not limited to what has been particularly described hereinabove, and other objects that the present disclosure could achieve will be more clearly understood from the following detailed description.

To achieve the object of the present invention, a method for reporting channel state information (CSI) by a user equipment (UE) in a wireless communication system according to one aspect of the present invention comprises the steps of measuring interference through an interference measurement resource (IMR) configured in a control region; and reporting, to a base station, CSI on the control region based on the result of the interference measurement, wherein the CSI on the control region includes information on quality of a downlink control channel configured through at least one control channel element (CCE) aggregation, and the information on quality of the downlink control channel may include information on at least one CCE aggregation level preferred by the UE to receive the downlink control channel.

To achieve the object of the present invention, a user equipment (UE) for reporting channel state information (CSI) in a wireless communication system according to another aspect of the present invention comprises a receiver; a transmitter; and a processor for measuring interference through an interference measurement resource (IMR) configured in a control region by using the receiver, and reporting, to a base station, CSI on the control region based on the result of the interference measurement, wherein the CSI on the control region includes information on quality of a downlink control channel configured through at least one control channel element (CCE) aggregation, and the information on quality of the downlink control channel may include information on at least one CCE aggregation level preferred by the UE to receive the downlink control channel.

The UE may determine at least one CCE aggregation level preferred by itself by assuming that a rank of the downlink control channel is fixed to 1.

The CSI on the control region may further include information on a group of PMIs (precoding matrix indexes) preferred by the UE, and the UE may determine a group of PMIs preferred by itself by assuming that the rank of the downlink control channel is fixed to 1.

The UE may report the CSI per at least one control resource set (CORESET) configured on the control region or report the CSI per search space set.

The UE may receive configuration information on the IMR from the base station. The IMR may be configured in a resource element (RE) level, an RE group (REG) level, a CCE level or a control channel candidate level.

The UE may measure a CSI-RS (reference signal) in the data region. The UE may acquire the CSI on the control region by using the result of measurement of the CSI-RS in the data region and the result of interference measurement through the IMR in the control region.

The information on the CSI-RS of the base station, which is configured in the data region, may be shared with a neighboring base station. Interference coordination corresponding to the control region on a resource of the CSI-RS configured in the data region may be performed by the base station and the neighboring base station.

The UE may perform blind detection for candidates of the downlink control channel.

At least one of CCE aggregation levels for blind detection and the number of candidates corresponding to each CCE aggregation level may be determined in accordance with at least one CCE aggregation level reported by the UE through the CSI.

The UE may omit blind detection for a candidate overlapped with the IMR, or assume that control information is rate matched or punctured for the IMR.

To achieve the object of the present invention, a method for receiving channel state information (CSI) by a base station in a wireless communication system according to still another aspect of the present invention comprises the steps of transmitting configuration information on an interference measurement resource (IMR) configured for interference measurement in a control region; and receiving CSI on the control region, which is generated based on the IMR, from a UE, wherein the CSI on the control region includes information on quality of a downlink control channel configured through at least one control channel element (CCE) aggregation, and the information on quality of the downlink control channel may include information on at least one CCE aggregation level preferred by the UE to receive the downlink control channel.

The CSI on the control region may further include information on a group of PMIs (precoding matrix indexes) preferred by the UE.

The base station may interpret at least one CCE aggregation level preferred by the UE and a group of PMIs preferred by the UE by assuming that a rank of the downlink control channel is fixed to 1.

The base station may receive the CSI per at least one control resource set (CORESET) configured on the control region or receive the CSI per search space set.

The base station may transmit a CSI-RS (reference signal) from the data region.

The CSI may be generated using the result of measurement of the CSI-RS in the data region and the result of interference measurement through the IMR in the control region.

The information on CSI-RS of the base station, which is configured in the data region, may be shared with a neighboring base station, and interference coordination corresponding to the control region on a resource of the CSI-RS configured in the data region may be performed by the base station and the neighboring base station.

The base station may transmit the downlink control channel to the UE.

The base station may determine a CCE aggregation level of the transmitted downlink control channel in accordance with at least one CCE aggregation level received through the CSI.

If the transmitted downlink control channel is overlapped with the IMR, the base station may rate match or puncture control information carried by the transmitted downlink control channel for the IMR.

A base station for performing the aforementioned method for receiving CSI may be provided in accordance with further still another aspect of the present invention.

According to one embodiment of the present invention, as CSI is generated through an IMR specific to a control region, an interference measurement result of the control region may exactly be reflected and a preferred CCE aggregation level of a UE is reported as channel quality information, whereby the CSI may be reported in an optimal form for a control channel.

The effects that can be achieved with the present disclosure are not limited to what has been particularly described hereinabove and other advantages of the present disclosure will be more clearly understood from the following detailed description.

BRIEF DESCRIPTION OF THE DRAWINGS

FIG. 3 is a diagram illustrating a resource grid for a downlink slot for 3GPP LTE/LTE-A system.

DETAILED DESCRIPTION

The following description of embodiments of the present disclosure may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. 3GPP LTE adopts OFDMA in downlink and adopts SC-FDMA in uplink. LTE-A (LTE-Advanced) is an evolved version of 3GPP LTE.

For clarity, the following description mainly concerns 3GPP based mobile communication system, but the technical idea of the present disclosure is not limited thereto. Specific terms used in the following description are provided to provide further understanding of the present disclosure and use of the terms may be modified to other forms within the scope of the present disclosure.

Prior to discussion of the New RAT, the 3GPP LTE/LTE-A system will briefly be described. The following description of 3GPP LTE/LTE-A may be referenced to help understanding of New RAT, and some LTE/LTE-A operations and configurations that do not conflict with the design of New RAT may also be applied to New RAT. New RAT may be referred to as 5G mobile communication for convenience.

3GPP LTE/LTE-A System

Figure 1:
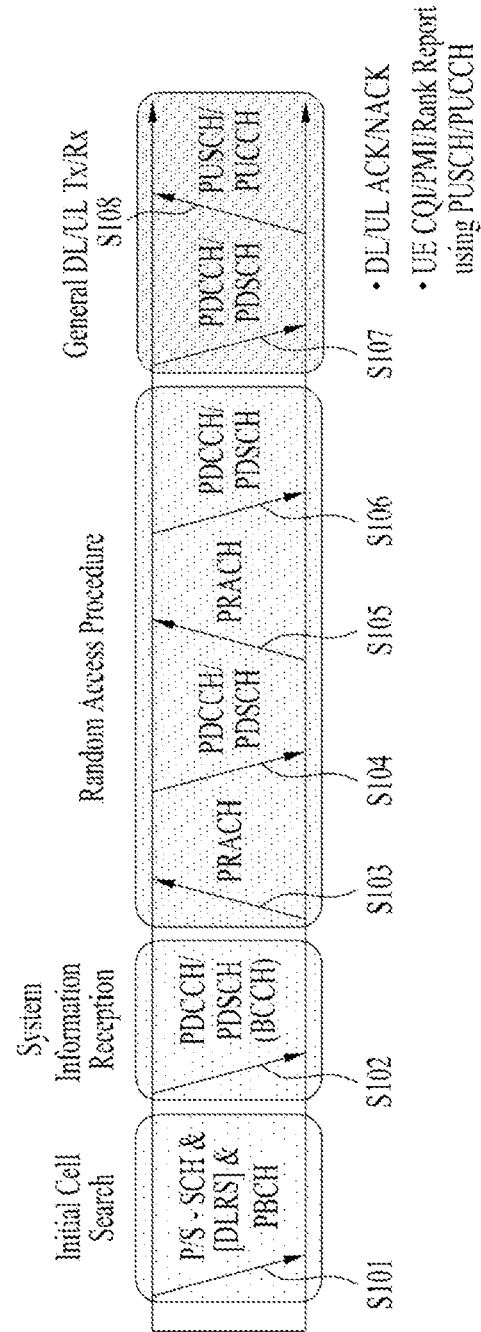
FIG. 1 is a diagram illustrating physical channels used for 3GPP LTE/LTE-A system and a general signal transmission method using the same.

FIG. 1 is a diagram illustrating physical channels used for 3GPP LTE/LTE-A system and a general signal transmission method using the same.

Referring to FIG. 1, if power of a user equipment (UE) is turned on or the UE enters a new cell, the UE may perform an initial cell search operation for matching synchronization with a base station (BS) and the like in operation S101. To this end, the UE may receive a primary synchronization channel (P-SCH) and a secondary synchronization channel (S-SCH) from the BS, may match synchronization with the BS and may then obtain information such as a cell ID and the like. Subsequently, the UE may receive a physical broadcast channel (PBCH) from the BS and may be then able to obtain intra-cell broadcast information. Meanwhile, the UE may receive a downlink reference signal (DL RS) and may be then able to check a DL channel state.

Upon completing the initial cell search, the UE may receive a physical downlink control channel (PDCCH) and a physical downlink shared control channel (PDSCH) according to the physical downlink control channel (PDCCH) in operation S102, thereby obtaining a detailed system information.

Thereafter, the UE may perform a random access procedure to complete access to the BS as in operations S103 to S106. To this end, the UE may transmit a preamble via a physical random access channel (PRACH) (S103) and may then receive a response message on PDCCH and a corresponding PDSCH in response to the preamble (S104). In case of contention-based random access, it may perform a contention resolution procedure such as a transmission (S105) of an additional physical random access channel and a channel reception (S106) of a physical downlink control channel and a corresponding physical downlink shared channel.

Upon performing the above-mentioned procedures, the UE may perform a PDCCH/PDSCH reception (S107) and a PUSCH/PUCCH (physical uplink shared channel/physical uplink control channel) transmission (S108) as a general uplink/downlink signal transmission procedure. Control information transmitted to a BS by a UE may be commonly named uplink control information (hereinafter abbreviated UCI). The UCI may include Hybrid Automatic Repeat and reQuest Acknowledgement/Negative-ACK (HARQ-ACK/NACK), Scheduling Request (SR), Channel Quality Indication (CQI), Precoding Matrix Indication (PMI), Rank Indication (RI) and the like. In the present specification, the HARQ-ACK/NACK is simply called HARQ-ACK or ACK (NACK) (A/N). The HARQ-ACK includes at least one of a positive ACK (simply, ACK), a negative ACK (NACK), DTX, and NACK/DTX. The UCI is normally transmitted on PUCCH. Yet, when both control information and traffic data need to be simultaneously transmitted, the UCI may be transmitted on PUSCH. Moreover, the UCI may be non-periodically transmitted in response to a request/indication made by a network.

Figure 2A:
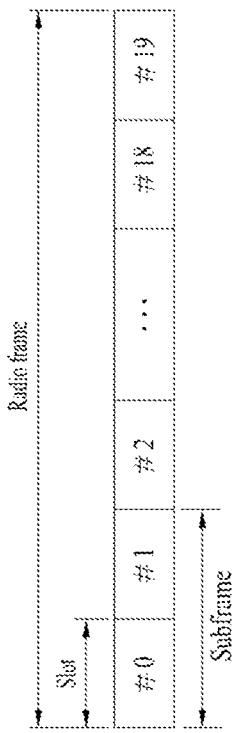
FIGS. 2A and 2B are diagrams illustrating a structure of a radio frame for 3GPP LTE/LTE-A system.
Figure 2B:
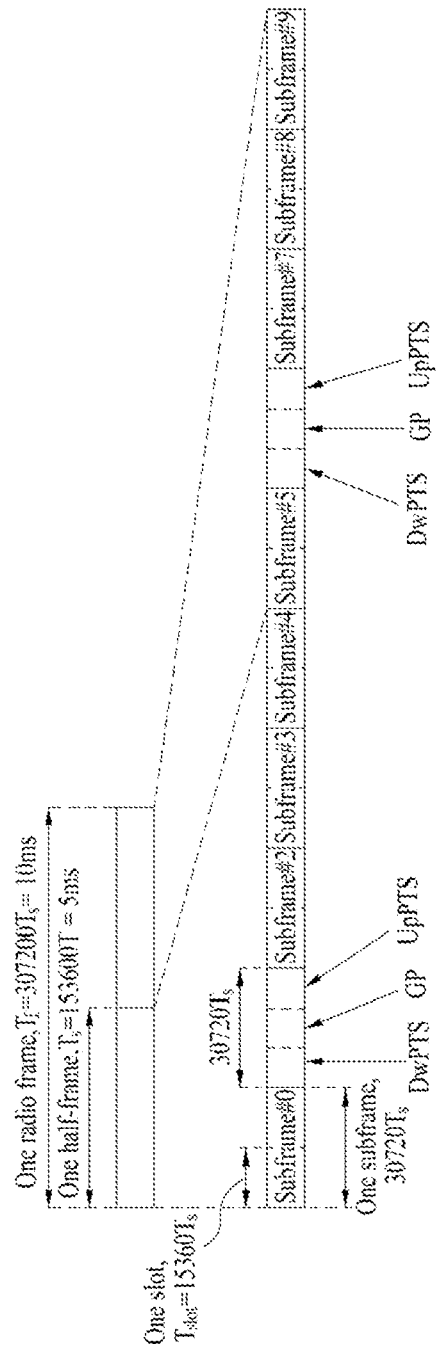

FIGS. 2A and 2B are diagrams illustrating a structure of a radio frame. Referring to FIGS. 2A and 2B, UL/DL (uplink/downlink) data packet transmission is performed in a unit of subframe in a cellular OFDM radio packet communication system. And, one subframe is defined as a predetermined time interval including a plurality of OFDM symbols. In the 3GPP LTE standard, a type-1 radio frame structure applicable to FDD (frequency division duplex) and a type-2 radio frame structure applicable to TDD (time division duplex) are supported.

FIG. 2A is a diagram for a structure of a type 1 radio frame. A DL (downlink) radio frame includes 10 subframes. Each of the subframes includes 2 slots in time domain. And, a time taken to transmit one subframe is defined as a transmission time interval (hereinafter abbreviated TTI). For instance, one subframe may have a length of 1 ms and one slot may have a length of 0.5 ms. One slot may include a plurality of OFDM symbols in time domain and may include a plurality of resource blocks (RBs) in frequency domain.

Since 3GPP LTE system uses OFDM in downlink, OFDM symbol is provided to indicate one symbol period. The OFDM symbol may be named SC-FDMA symbol or symbol period. Resource block (RB) may include a plurality of contiguous subcarriers in one slot.

The number of OFDM symbols included in one slot may vary according to a configuration of Cyclic Prefix (CP). The CP may be categorized into an extended CP and a normal CP. For instance, in case that OFDM symbols are configured by the normal CP, the number of OFDM symbols included in one slot may be 7. In case that OFDM symbols are configured by the extended CP, since a length of one OFDM symbol increases, the number of OFDM symbols included in one slot may be smaller than that of the case of the normal CP. In case of the extended CP, for instance, the number of OFDM symbols included in one slot may be 6. If a channel status is unstable (e.g., a UE is moving at high speed), it may use the extended CP to further reduce the inter-symbol interference.

When a normal CP is used, since one slot includes 7 OFDM symbols, one subframe includes 14 OFDM symbols. In this case, first maximum 3 OFDM symbols of each subframe may be allocated to PDCCH (physical downlink control channel), while the rest of the OFDM symbols are allocated to PDSCH (physical downlink shared channel).

FIG. 2B is a diagram for an example of a structure of a type 2 radio frame. The type-2 radio frame includes 2 half frames. Each of the half frames includes 5 subframes, DwPTS (downlink pilot time slot), GP (guard period) and UpPTS (uplink pilot time slot) and one subframe consists of two slots. The DwPTS is used for initial cell search, synchronization or channel estimation in a UE. The UpPTS is used for channel estimation in a BS and uplink transmission synchronization of a UE. The guard period is a period for eliminating interference generated in uplink due to multi-path delay of a downlink signal between uplink and downlink.

The above-described structures of the radio frame are exemplary only. And, the number of subframes included in a radio frame, the number of slots included in the subframe and the number of symbols included in the slot may be modified in various ways.

FIG. 3 is a diagram illustrating a resource grid for a downlink slot.

Referring to FIG. 3, one downlink (DL) slot may include a plurality of OFDM symbols in time domain. In particular, one DL slot exemplarily includes 7(6) OFDM symbols and one resource block (RB) includes 12 subcarriers in frequency domain. Each element on a resource grid is called a resource element (hereinafter abbreviated RE). One resource block includes 12×7(6) resource elements. The number NRB of resource blocks included in a DL slot may depend on a DL transmission bandwidth. And, the structure of an uplink (UL) slot may be identical to that of the DL slot and OFDM symbol is replaced by SC-FDMA symbol.

Figure 4:
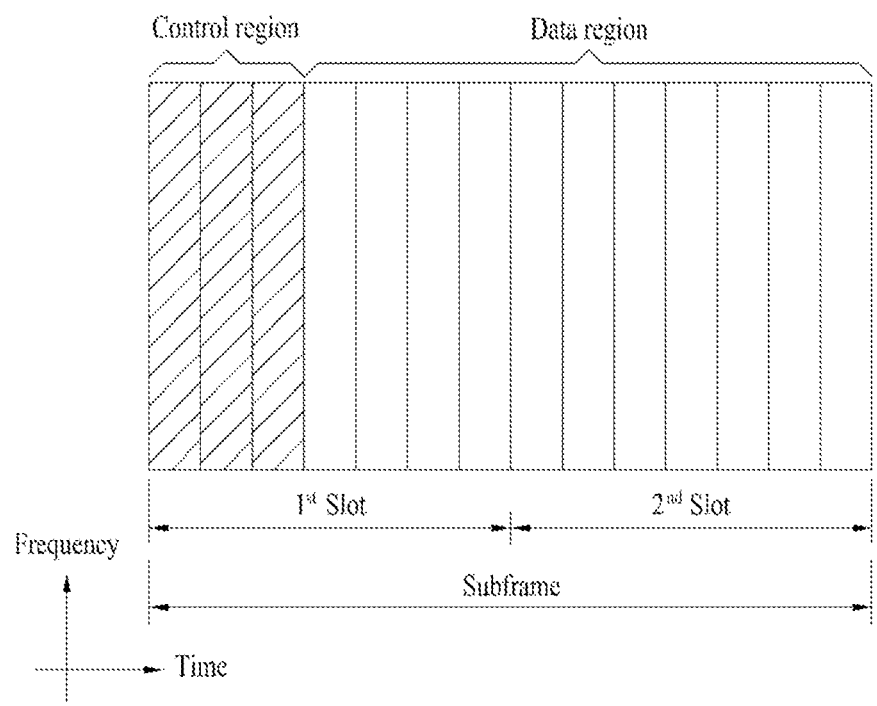
FIG. 4 is a diagram illustrating a structure of a downlink subframe for 3GPP LTE/LTE-A system.

FIG. 4 is a diagram illustrating a structure of a downlink subframe.

Referring to FIG. 4, maximum 3(4) OFDM symbols situated at a fore part of a first slot of one subframe correspond to a control region to which control channels are allocated. The rest of OFDM symbols correspond to a data region to which PDSCH (physical downlink shared channel) is allocated. PDSCH is used for carrying a transport block (hereinafter abbreviated TB) or a codeword (hereinafter abbreviated CW) corresponding to the TB. The TB means a data block delivered from a MAC (medium access control) layer to a PHY (physical) layer on a transport channel. The CW corresponds to a coded version of the TB. Correlation between the TB and the CW may vary depending on a swapping. In the present specification, PDSCH, a TB, and a CW are used in a manner of being mixed. Examples of DL control channels used by LTE (-A) may include PCFICH (Physical Control Format Indicator Channel), PDCCH (Physical Downlink Control Channel), PHICH (Physical hybrid automatic repeat request indicator Channel) and the like. The PCFICH is transmitted in a first OFDM symbol of a subframe and carries information on the number of OFDM symbols used for a transmission of a control channel within the subframe. The PHICH carries a HARQ-ACK (hybrid automatic repeat and request acknowledgement) signal in response to an UL transmission. The HARQ-ACK response includes a positive ACK (simply, ACK), a negative ACK (NACK), DTX (discontinuous transmission), or NACK/DTX. In this case, HARQ-ACK, HARQ ACK/NACK, and ACK/NACK are used in a manner of being mixed.

Control information carried on PDCCH may be called downlink control information (hereinafter abbreviated DCI). The DCI includes resource allocation information for a UE or a UE group and different control information. For instance, the DCI includes UL/DL scheduling information, UL transmit (Tx) power control command, and the like.

Figure 5:
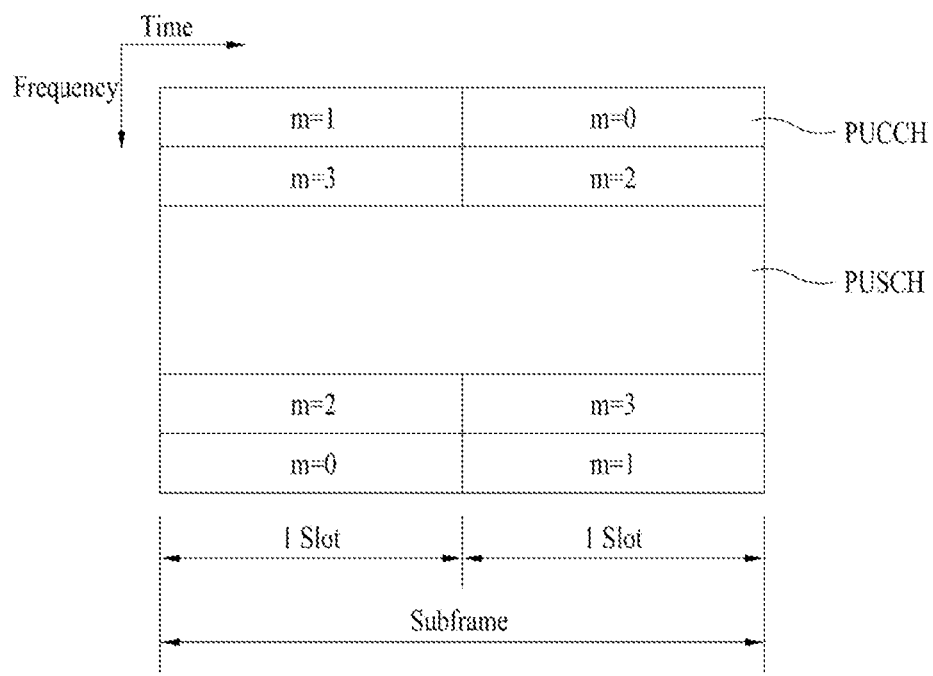
FIG. 5 is a diagram illustrating a structure of an uplink subframe for 3GPP LTE/LTE-A system.

FIG. 5 is a diagram illustrating a structure of an uplink subframe.

Referring to FIG. 5, an uplink subframe includes a plurality of slots (e.g., 2 slots). A slot may include a different number of SC-FDMA symbols according to a length of CP. A UL subframe may be divided into a control region and a data region in frequency domain. The data region includes PUSCH and can be used for transmitting a data signal such as an audio and the like. The control region includes PUCCH and can be used for transmitting UL control information (UCI). The PUCCH includes an RB pair situated at the both ends of the data region on a frequency axis and hops on a slot boundary.

The PUCCH can be used for transmitting control information such as SR (Scheduling Request), HARQ-ACK and/or CSI (Channel State Information).

New RAT

According to performance requirements for the new RAT, a subframe needs to be newly designed to satisfy low latency. The 3GPP LTE system has been designed in a frame structure having TTI of 1 ms, and a data request latency time for a video application is 10 ms. However, future 5G technology requires data transmission of lower latency due to the introduction of a new application such as real-time control and tactile internet, and aims to provide data latency reduced by 10 times as compared with the related art.

Self-Contained Subframe

Figure 6:
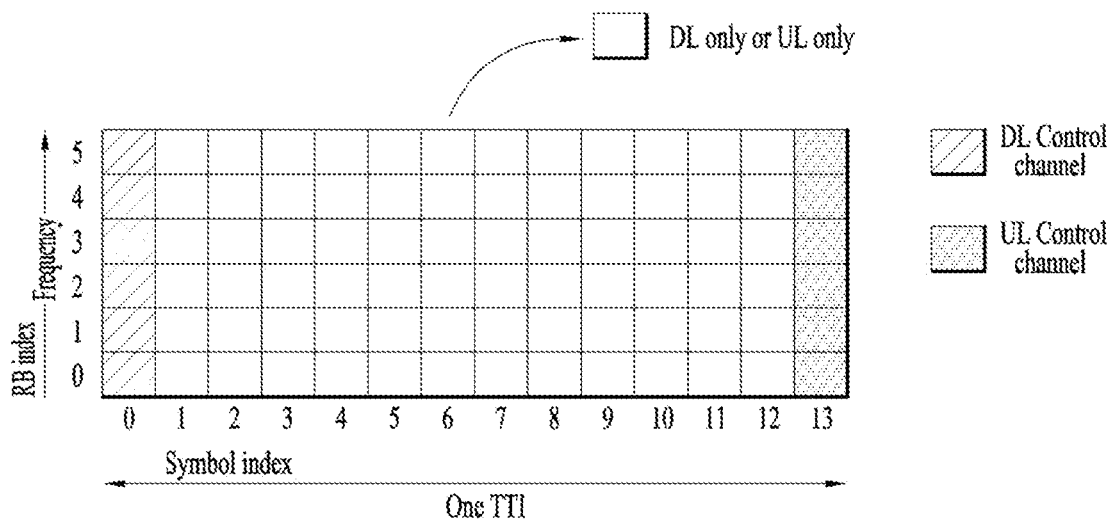
FIG. 6 is a diagram illustrating a structure of a self-contained subframe according to one embodiment of the present disclosure.

FIG. 6 is a diagram illustrating a structure of a self-contained subframe according to one embodiment of the present disclosure.

According to a TDD-based self-contained subframe structure, both a resource region for DL and a resource region for UL (e.g., DL and UL control channels) exist in one subframe.

In FIG. 6, hatched areas indicate downlink control regions and black colored areas indicate uplink control regions. Areas having no mark may be used for downlink data transmission or uplink data transmission.

In this self-contained subframe structure, downlink (DL) transmission and uplink (UL) transmission are performed in due order within one subframe, whereby DL data may be transmitted and UL ACK/NACK may be received within one subframe. Similarly, UL data may be transmitted and DL ACK/NACK may be received within one subframe. As a result, the time required for data re-transmission may be reduced when an error occurs in data transmission, whereby latency of final data transfer may be minimized.

As described above, the expression "Self-Contained" may cover that a response (ACK/NACK) to DL or UL transmitted within the corresponding subframe is received within the corresponding subframe. However, since the time of one subframe or more may be required for transmission and response according to processing performance of the UE/eNB, the self-contained subframe will be defined as a subframe that may self-contain DL control information, DL/UL data and UL control information. That is, UL control information of Self-contained Subframe is not limited to HARQ-ACK information on DL data transmitted at the corresponding subframe.

This self-contained subframe structure requires a time gap that allows a BS and a UE to switch a transmission mode to a reception mode and vice versa. To this end, at least one OFDM symbol on which DL to UL switching is performed is set as a guard period (GP) in the self-contained subframe structure.

Although the self-contained subframe structure shown in FIG. 6 shows that a subframe is configured in the order of DL control region-data region-UL control region, the present disclosure is not limited thereto. For example, as another self-contained subframe structure, a subframe may be configured in the order of DL control region-UL control region-data region.

Also, for convenience of description, one subframe includes a total of 14 OFDM symbols, and one OFDM symbol is allocated to each of the DL control region and the UL control region. However, one or more OFDM symbols may be allocated to each of the DL control region and the UL control region. Similarly, the number of OFDM symbols included in one subframe may be changed.

Figure 7:
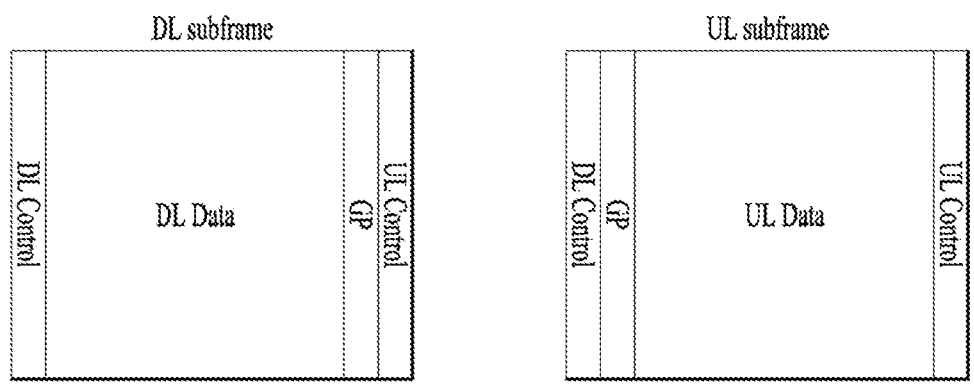
FIG. 7 is a diagram illustrating a downlink self-contained subframe and an uplink self-contained subframe according to one embodiment of the present disclosure.

FIG. 7 is a diagram illustrating a DL subframe and a UL subframe according to one embodiment of the present disclosure.

Referring to FIG. 7, the GP is located at the time when DL is switched to UL. For example, the GP is located between the DL data region and the UL control region at the DL subframe and is located between the DL control region and the UL data region at the UL subframe.

The GP may include Tx/Rx switching time of the eNB/UE and a timing advance (TA) for UL transmission of the UE.

Analog Beamforming

Since a wavelength becomes short in the field of Milli-meter Wave (mmW), a plurality of antenna elements may be installed in the same area. That is, a wavelength is 1 cm in a band of 30 GHz, and a total of 100 antenna elements of a 2D array may be arranged in a panel of 5 by 5 cm at an interval of 0.5λ, (wavelength). Therefore, as a plurality of antenna elements are used, beamforming gain is enhanced, and coverage increase and/or throughput improvement is expected.

In the mmW scheme, if a transceiver unit (TXRU) is provided per antenna element, it is possible to control a transmission power and phase per antenna element, whereby independent beamforming may be performed for each frequency resource. However, a problem occurs in that effectiveness is deteriorated in view of cost when TXRU is independently provided for all of 100 antenna elements.

Therefore, a scheme for mapping a plurality of antenna elements into one TXRU and controlling a beam direction by an analog phase shifter may be considered. However, since this analog beamforming scheme forms beams in only one beam direction with respect to a full band, a problem occurs in that frequency selective beamforming is not available.

As a hybrid type of digital beamforming and analog beamforming, a hybrid beamforming scheme for mapping a total of B TXRUs into a total of Q antenna elements (where, B<Q) may be considered. In this case, although there is a difference depending on a mutual connection scheme of B TXRUs and Q antenna elements, the number of beam directions that enable simultaneous transmission is limited to B or less.

NR Control Channel

In the NR system, a unit forming the basis of transmission of a control channel may be defined as a NR-resource element group (REG) and/or a NR-control channel element (CCE).

The NR-REG may correspond to one OFDM symbol in the time domain and one physical resource block (PRB) in the frequency domain. One PRB may correspond to 12 subcarriers, and one CCE may correspond to 6 REGs.

Hereinafter, a control resource set (CORESET) and a search space (SS) will be described in brief. The CORESET may be a set of resources for control signal transmission, and the SS may be a set of candidate control channels which a UE performs blind detection for. The SS may be configured in the CORESET. For example, assuming that one SS is defined in one CORESET, CORESETs may be defined for a common search space (CSS) and a UE-specific search space (USS), respectively. As another example, multiple SSs may be defined in one CORESET. For example, the CSS and USS may be configured in the same CORESET. In the following description, a CSS may mean a CORESET in which the CSS is configured, and a USS may mean a CORESET in which the USS is configured.

A BS may transmit information on a CORESET to a UE. For example, the CORESET configuration of each CORESET and the time duration (e.g., 1, 2, or 3 symbol) thereof may be signaled. When interleaving is applied to a 1-symbol CORESET for CCE distribution, 2 or 6 REGs may be bundled. In the case of a 2-symbol CORESET, 2 or 6 REGs are bundled and time-first mapping may be applied. In the case of a 3-symbol CORESET, 3 or 6 REGs are bundled and time-first mapping may be applied. When REG bundling is performed, a UE may assumed that the same precoding is applied to a corresponding bundling unit.

In PDCCH of the legacy LTE system, SFBC (space-frequency block coding) based transmit diversity scheme has been introduced to improve decoding performance of a control channel. Also, for transmission of EPDCCH, the network may perform UE-dedicated Beamforming based on feedback of the UE, or may use 2-port RE-level Beam cycling scheme in accordance with a transmit diversity scheme. Regarding the transmit diversity scheme of the EPDCCH, it is general that SFBC has more excellent performance than RE-level Beam cycling. However, 2-port RE-level cycling has been introduced in the LTE system in accordance with the transmit diversity scheme of the EPDCCH due to SFBC paring problem occurring due to the number of DMRS REs and CSI-RS Configuration.

Meanwhile, UE-dedicated Beamforming based on reporting of the UE may be used in the NR system together with the transmit diversity scheme in preparation for a case that reliability of a channel state is reduced. If UE-dedicated Beamforming is used, the network may form beams suitable for each UE to perform control signaling (e.g., NR PDCCH transmission), thereby performing resource management more efficiently.

In this specification, a method for transmitting and receiving a control channel (e.g., NR PDCCH) in a New RAT system and details to be considered for each transmission scheme will be described.

CSI Measurement for 1-Port UE-Dedicated Beamforming

EPDCCH in the legacy LTE has been introduced to perform control signaling in a region to which data are transmitted. Therefore, CSI measured in a data region may be applied to the EPDCCH.

However, in the NR system, a control region and a data region may be divided from each other. Therefore, in order that the network performs UE-dedicated Beamforming in the control region, CSI measurement is required considering an interference environment in the control region. For example, in the NR system, it may be inappropriate to apply the result of signal measurement and/or interference measurement of CSI-RS on the data region to the control region as it is. This is because that the control region and the data region may be different from each other in an interference environment such as inter-cell interference coordination.

Therefore, a CSI measurement method for UE-dedicated Beamforming of a control channel will be suggested in accordance with one embodiment of the present invention. Examples which will be described later may be implemented solely or through combination.

Example 1. CSI Report Using RS in Data Region

The network may request the UE of CSI report for the control channel periodically/non-periodically. CSI (channel state information) on the control channel may include all of RI, PMI and CQI, or may include some (e.g., PMI) of RI, PMI and CQI. Also, in case of the control channel, the network may not perform multi-layer transmission in view of a single UE in consideration of decoding complexity of the UE which receives the control channel (e.g., perform SU-MIMO transmission). Therefore, a rank for the control channel may be fixed to 1.

For example, if the network requests CSI for data transmission, the UE devises an optimal rank for data transmission based on CSI-RS in the data region and optimal PMI, CQI, etc. in the corresponding rank. If the network requests CSI on the control channel, the UE may report optimal PMI (e.g., PMI for NR PDCCH) in a rank 1 status based on CSI-RS in the data region.

Additionally, if the UE should report information on CQI (e.g., CQI for NR PDCCH), the UE may report an optimal aggregation level for the control channel to the network to reduce overhead, etc. For example, the UE may report one AL of 1, 2, 4 and 8 by using 2 bits. Alternatively, the UE may report 1 or 2 ALs or report 4 or 8 ALs by using 1 bit. In this case, the CQI for the control channel may be interpreted by two groups. If the UE reports 0, the network may transmit the control channel by using a channel candidate of AL 1 or AL 2. In case of a control channel broadcast commonly within a cell, a channel candidate of AL 16 may be used. In this case, one value of 1, 2, 4, 8, and 16 may be reported as CQI, or the corresponding values may be grouped to report a corresponding group index.

In this way, the UE may report AL as information on CQI for the control channel, or may report a parameter (e.g., SINR) that may infer AL.

The UE may perform only blind decoding (BD) for the AL reported by itself to the network when performing blind decoding for the control channel. Alternatively, the UE may omit blind decoding for AL having a great difference from the AL reported by itself. Alternatively, the UE may select a channel candidate which will actually perform blind decoding or cancel blind decoding for a specific channel candidate if the number of blind decoding times (or the number of channel-estimated CCEs that may be used as indexes of channel estimation complexity) set by the network to a specific slot exceeds a value which is allowed. In this case, a high (blind decoding) priority may be given to the channel candidate of the AL reported by the UE.

As another example, the UE/network may give a priority to the reported AL. For example, BD times may be set differently for each AL depending a control channel CQI report value of the UE. For example, if the UE monitors the control channel after reporting AL 1 as a CQI value for the control channel, the UE may omit blind decoding for the control channel candidate corresponding ALs 4 and 8, and may perform BD times for AL 1 instead of BD times given to the ALs 4 and 8. For example, if BD times for the AL 4 control channel candidate is N and BD times for the AL 8 control channel candidate is M, the UE may perform blind decoding for the AL 1 control channel candidate N+M times in addition to BD times P for the AL 1.

A start CCE index of the control channel candidate added in accordance with the BD times increased as above may newly be designated by an independent hashing function. Alternatively, the UE may perform a hashing function for control channel candidates of the corresponding AL including the added control channel candidate. For example, the UE may set a value corresponding to the number of channel candidates set to the corresponding AL, among parameters included in the hashing function, based on the number of coordinated channel candidates.

CSI report for the control channel may periodically be performed, or an aperiodic CSI request using DCI may be indicated by the network, or an aperiodic CSI report may be configured for the UE through higher layer signaling such as RRC signaling.

Meanwhile, in the description of Example 1, the others except that CSI of the data region is reused in the control region, for example, CSI report of the control channel, etc. may be applied to the examples which will be described later.

CSI Measurement and Report of Control Channel

The following description will be summarized as follows.

CSI measurement resources may include CSI-RS of the data region and IMR (interference measurement resource) of the control region. IMR may consider RE level, REG level, CCE level or Candidate level, and a port index of IMR may be indicated.

Contents of CSI report may include all or some of CQI, RI and PMI. RI may be fixed to 1. CQI may be reported by being replaced with a preferred AL. As PMI, a group of preferred PMIs may be reported.

As an operation subsequent to CSI report, the UE may select AL based on the reported CQI (AL). Also, the UE may distribute the number of control channel candidates based on the reported CQI (AL).

For inter-cell coordination, the base stations may share CSI-RS information of the control channel (via X2 signaling).

CSI measurement and report may be performed per CORESET or search space set.

Example 2. CSI Report Using RS QCL (Quasi Co-Located) with Control RS

The network may configure CSI-RS that may be assumed to have the same property as that of the RS of the control channel (e.g., CSI process). For example, the UE may assume that large-scale property such as Doppler diffusion, delay diffusion, Doppler shift, average gain and/or average delay regarding QCL RS ports is the same as that of the control channel.

CSI process for the control channel may be identified from that for the data channel. The number of CSI-RS ports for the control channel may be configured differently from the number of CSI-RS ports for the data channel. For example, the CSI-RS for the data channel may be 16-ports, whereas the CSI-RS for the control channel may be 2-ports. Each UE may measure and report CSI of the control channel based on the CSI-RS for the control channel configured from the network. At this time, the CSI which is reported may be the same as contents configured in the Example 1. For example, the UE may measure and report PMI, CQI, etc. under a fixed rank.

For example, CSI-RS for CSI measurement of the control channel may be configured in the data region. In this case, it is advantageous that the CSI-RS is transmitted through resources of the data channel not relatively less resources of the control channel. However, interference property of the data region may be different from that of the control region. Therefore, if the CSI-RS for CSI measurement of the control region is transmitted from the data region, the network may implement interference property similar to that of the control region in the corresponding CSI-RS region. For example, the network may perform inter-cell coordination for the corresponding CSI-RS region such that interference property, etc. in the control region may be measured.

For example, if the CSI-RS for control channel CSI measurement is configured in the data region, a specific cell may share a configuration of the corresponding CSI-RS with a neighboring cell 's' through X2-interface (e.g., backhaul interface between base stations). For example, the neighboring cell which has received the corresponding CSI-RS configuration may configure CSI-RS in its cell in the same CSI-RS configuration as the received configuration, wherein the corresponding CSI-RS property (e.g., CSI-RS power, etc.) may be configured in the same manner as the control channel.

When CSI of the control region is measured with the corresponding CSI-RS resource in each cell as above, the same environment as the control channel may be given even though the corresponding CSI-RS resource is located in the data region.

Example 3. PMI Group Report

The network may command the UE to report a preferred PMI group (e.g., a plurality of PMI groups).

The UE may report a plurality of PMIs expected to indicate received SINR at a specific threshold value or more under a given rank (e.g., rank 1). If the preferred PMI group is reported, the network may select one of the PMIs which belong to the reported PMI group and perform UE-dedicated Beamforming to transmit the control channel. Alternatively, the network may transmit the control channel by using a transmit diversity scheme (e.g., semi-OL scheme) to which the plurality of PMIs are applied. For example, if the transmit diversity scheme is precoder cycling, the network may apply the PMIs, which belong to the PMI group reported by the UE, to a cycling unit resource in turn.

Example 4. IMR (Interference Measurement Resource) in Control Region

CSI acquired by the UE through interference measurement using CSI-RS resource configured for the data channel and/or IMR may not be suitable for CSI for the control channel having interference property different from that of the data region.

To solve this, the network may configure IMR in the control channel (region). The network may signal IMR resource information on interference measurement for the control region to the UE or UE-group. For example, a time/frequency resource set to which IMR is set may be delivered to the UE through higher layer signaling such as RRC signaling.

For example, information on a subframe (or slot) set may be included in the IMR configuration as IMR information in a time domain. Also, a specific control resource set may be indicated as IMR information in a frequency domain.

Also, if a plurality of control RSs (e.g., RS configured in the control region and RS for control channel demodulation) are configured, the network may designate a specific one of antenna ports for the control RSs as IMR usage. For example, the network may designate a port of the specific control RS included in a specific CORESET of a specific subframe set as IMR. In this case, the UE may perform an operation such as blind detection (BD) for the control channel by assuming that the corresponding port does not exist in the specific CORESET. For example, the control RS resource on the antenna port designated as IMR usage may be subjected to nulling, and the corresponding antenna port may not be used even for control channel transmission. Therefore, BD times associated with the corresponding port when the UE performs BD for the control channel may be omitted or it may be assumed that BD times associated with the corresponding port may be shifted to CORESET or RS port.

As another method for designating IMR of an RE (resource element) level, the network may designate some of REs into which control information is mapped, as IMR. A location of RE(s) designated as IMR may be signaled by the network. The UE may assume that control information is rate matched in the IMR, or may perform control resource indexing (e.g., REG indexing or CCE indexing) except IMR.

As still another method for designating IMR, the network may configure a specific control channel candidate (s) in CORESET, specific REG and/or specific CCE as IMR. If the control channel candidate, the REG and/or CCE is configured as IMR, the UE may omit blind decoding for the control channel candidate associated with the corresponding resource. Alternatively, the UE may determine the control channel candidate by performing re-indexing except the corresponding resource.

In the NR system, a search space may be configured in the UE to configure a monitoring periodicity for a specific CORESET, AL and/or the number of control channel candidates per AL. Since it is preferable that CSI is measured for resources having similar properties, CSI measurement and report for the control channel may be performed for each CORESET or search space set.

1-Port TxD Scheme with 2-Port Allocation

In the current NR system, SFBC, 1-port RB-level Precoder cycling, 2-port RE-level Cycling, etc. may be considered as a transmit diversity TxD scheme. 1-port RB-level precoder cycling is a transmit diversity scheme that obtains diversity gain by applying different precoding to each PRB.

In one embodiment of the present invention, when 1-port RB-level precoder cycling is used, 1-port transmission scheme is used in view of each UE to increase capacity for the control channel. However, it is suggested to implement MU-MIMO for a transmit diversity scheme by applying 2-ports in view of system. For example, if the network transmits the control channel to two UEs by using both of 2-ports, 1 UE may receive the control channel through any one of the 2-ports.

Even though 1-port transmission is only used for the control channel, RS configuration of 2-ports is required to improve MU-MIMO throughput in a UE-dedicated Beamforming scheme.

Figure 8:
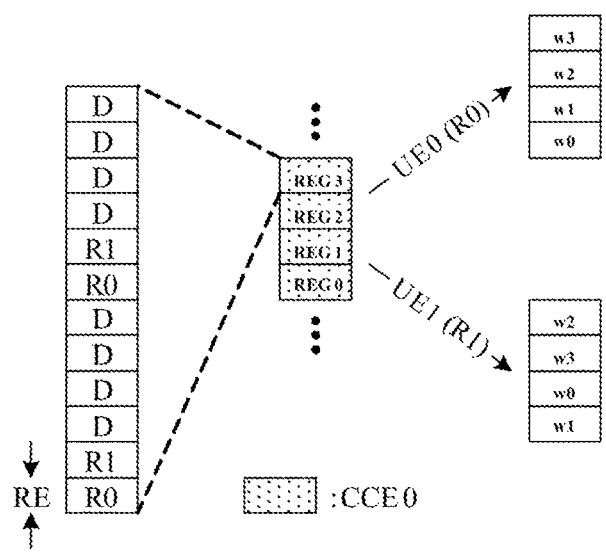
FIG. 8 is a diagram illustrating MU-MIMO using 1-port RB-level precoder cycling in accordance with one embodiment of the present invention.

FIG. 8 is a diagram illustrating MU-MIMO using 1-port RB-level precoder cycling in accordance with one embodiment of the present invention.

In FIG. 8, REG is the smallest unit resource configuring the control channel, and may be defined as a resource region corresponding to 1 symbol in the time domain and 1 PRB in the frequency domain. Also, for convenience, it is assumed that two RS ports are configured in each REG and RS is mapped into two REs per 1 RS port in 1 REG. Also, although it is assumed in FIG. 8 that localized mapping is used for the control channel, the present invention is not limited to the example of FIG. 8. The present invention may be applied to even distributed mapping in which four REGs constituting CCE are non-contiguously arranged in the time/frequency domain.

The network may multiplex the control channel for UE0 and the control channel for UE1 into the same resource (e.g., CCE0). The control channels of UE0 and UE1 may be associated with RS ports R0 and R1, respectively. w0, w1, w2 and w3 mean precoding matrixes. It is preferable that precoder matrixes for different UEs in the same resource are orthogonal to each other.

The network may indicate RS port, which should perform blind detection for each UE or UE group, by using higher layer signaling. Alternatively, the RS port may previously be defined such that the UE may perform blind decoding for all ports. In this case, all BD times may divisionally be distributed to each port. Alternatively, RS port for which each UE (or UE group) will perform BD may be determined based on UE ID (or UE group ID).

If 1-port RB-level precoder cycling is used as a transmit diversity scheme, PRB bundling may be introduced to improve channel estimation performance for each control channel candidate. In this case, the UE needs to perform a different operation for a case that RB-level precoder cycling is used and a case that UE-dedicated Beamforming is used.

In case of UE-dedicated Beamforming, since the network forms beams suitable for a corresponding UE based on a feedback of the UE, it is preferable that PRB bundling is applied to resources which are arranged continuously. On the other hand, according to RB-level precoder cycling, since different precoding is applied to each RB, it is not appropriate to perform channel estimation in a unit of bundle.

Therefore, if 1-port RB-level precoder cycling is used and two RS ports are allocated for each REG, the network may signal information regarding bundling to the UE. Meanwhile, the PRB bundling method which is suggested may be applied regardless of a transmission scheme.

For example, PRB bundling size may be signaled per CORESET. Alternatively, a resource mapping type (e.g., localized/distributed) is indicated per CORESET, and bundling may be determined depending on the indicated mapping type. For example, if localized mapping is used, the UE may assume that bundling is available for a PRB bundling size which is previously defined or signaled by the network. If distributed mapping is used, the UE may assume that the PRB bundling size is 1.

For another example, the PRB bundling size may be set for each UE (or UE group) regardless of the resource mapping type or CORESET. In this case, if REGs in a control channel candidate which is decoded are continuously arranged in the frequency domain, regardless of the resource mapping type or CORESET (or search space), the UE may assume that bundling is available for the PRB bundling size.

Meanwhile, since the number of REGs continuously arranged within the control channel candidate may be different depending on AL, the network may set a size of PRB bundling per AL and signal the set size to the UE (or UE group) (e.g., through RRC signaling).

In this way, the PRB bundling size in NR PDCCH may be set differently per CORESET, resource mapping type (localized/distributed) and/or AL, and the network may signal the PRB bundling size to the UE. Alternatively, the network may signal a maximum PRB bundling size, and the UE may assume that PRB bundling is performed in resources continuous on frequency in a unit of a maximum PRB bundling size. At this time, the actual PRB bundling size may be determined by MIN [signaled PRB bundling size, the number of contiguous REGs].

Distributed Resource Mapping

Distributed resource mapping is a resource mapping method for obtaining diversity gain by distributing the control channel in the time/frequency domain. Distributed resource mapping may be used to improve decoding performance if there is no channel information from the UE or channel information is incorrect.

Distributed resource mapping may be implemented in REG level or CCE level. For example, in case of distributed resource mapping of REG level, the network may uniformly arrange the respective REGs constituting CCEs in an entire resource region. Distributed resource mapping of CCE level means that the respective CCEs are configured to adjoin each other in the time/frequency domain but CEEs aggregated to configure a control channel candidate are distributed.

This embodiment suggests a method for arranging distributed unit resources (e.g., REG, CCE) and a method for enabling a UE to assume same precoding in distributed resource mapping.

In the following description, REG set may mean resources contiguous in the frequency domain among resources of each control channel candidate in distributed resource mapping. Also, the REG set may be defined as REG(s) in X RB(s) in the frequency domain. In this case, even in case of REG(s) which are not contiguous in X RB(s), the UE may regard the corresponding REG(s) as contiguous REG(s). At this time, a value of X may previously be defined, or may be indicated by the network (e.g., through RRC signaling).

Alternatively, the REG set may be defined as a PRB bundling set which may be a set of X contiguous PRBs. Even in case of non-contiguous PRB(s) in the PRB bundling set, the UE may regard the corresponding PRB(s) as contiguous PRB(s).

If the UE assumes that same precoding is applied in the REG set or PRB bundling set, a corresponding unit may not be all of corresponding sets. For example, the UE may assume the same precoding restrictive to REG(s) or PRB(s) belonging to each control channel candidate in the REG set or PRB bundling set.

Option 1. Same Precoding in REG Set

The UE may assume that same precoding has been applied to contiguous resources in the frequency domain within each control channel candidate to which distributed resource mapping is applied. In this case, diversity according to distribution may be acquired by distribution of REGs, and enhancement in channel estimation performance may be expected by PRB bundling in each REG group. In case of Option 1, gain may be obtained when channel change between frequency intervals is serious in the frequency domain and little occurs in each frequency interval.

Option 2. Different Precoding in REG Set

It is preferable to acquire diversity gain even in the REG set if channel change is serious in the frequency domain. Therefore, in option 2), PRB bundling may be prohibited regardless of actual resource arrangement in distributed resource mapping (for example, even though resources contiguous on frequency are allocated).

Option 1/Option 2 may be configured by the network. For example, the network may signal whether the UE may assume same precoding for resources continuously allocated in the frequency domain per UE (or UE group) or resource set (e.g., CORESET, search space).

Figure 9:
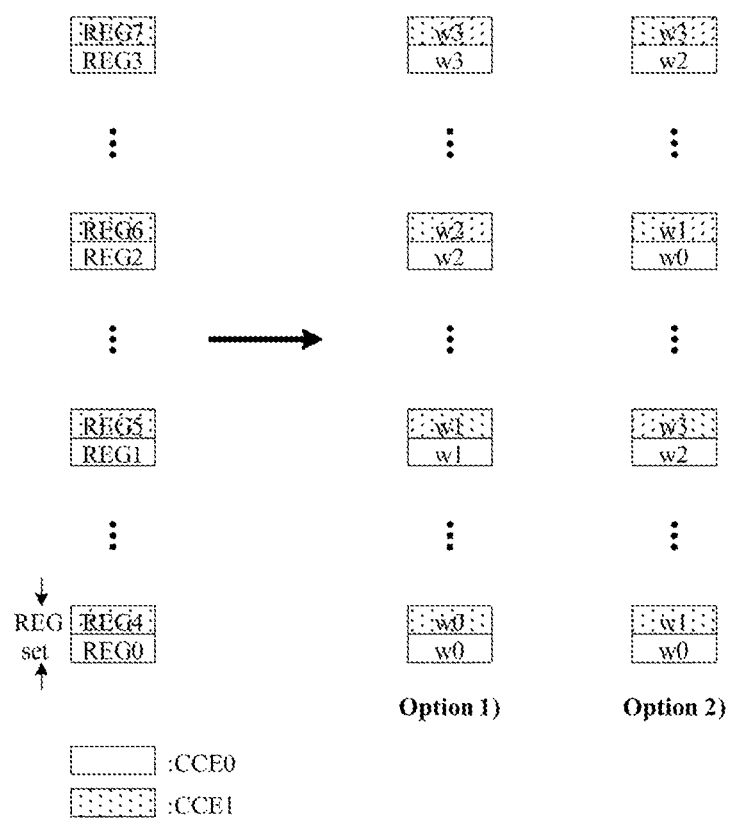
FIG. 9 is a diagram illustrating that 1-port RB-level precoder cycling is applied as a transmission diversity scheme in accordance with one embodiment of the present invention.

FIG. 9 is a diagram illustrating that 1-port RB-level precoder cycling is applied as a transmission diversity scheme in accordance with one embodiment of the present invention.

In FIG. 9, it is assumed that CCE0 and CCE1 are aggregated to configure AL 2-control channel candidate, and distributed resource mapping of REG-level is applied. Also, it is assumed in FIG. 9 that REGs configuring each CCE are distributively arranged but CCE aggregation is performed between contiguous CCEs. However, the present invention is not limited to the example of FIG. 9 and may be applied to REGs contiguous on the frequency domain in a control channel candidate into which distributed resources are mapped.

Referring to FIG. 9, if Option 1 is used, PRB bundling may be applied to REGs which belong to each REG set. If Option 2 is used, diversity gain according to precoding cycling may be expected in the REG set.

Meanwhile, when PRB bundling is applied, PRB bundling performance may be deteriorated seriously if there is no rule for a start resource where PRB bundling between the network and the UE starts, PRB bundling size, etc. For example, if the network applies PRB bundling to REG0 to REG3 but the UE performs channel estimation by applying PRB bundling to REG1 to REG4, performance may be deteriorated due to different precoding, etc.

Therefore, to solve this problem, a reference for determining a start point of PRB bundling in a UE when PRB bundling size is given is suggested. In accordance with the following embodiments, the UE may identify an interval to which PRB bundling is applied, based on a PRB bundling start point and PRB bundling size. If a plurality of resources (e.g., REG), which belong to a control channel candidate, and for which the UE performs blind decoding, exist in one PRB bundling interval, the UE may assume same precoding for the corresponding resources. The following examples (i) to (v) may be used respectively based on a single base or through combination. For example, a different PRB bundling reference may be applied depending on a resource mapping type.

(i) PRB bundling may be applied in the order of the lowest PRB (or the lowest REG) per CCE.

(ii) PRB bundling may be applied in the order of the lowest PRB (or the lowest REG) per control channel candidate.

For example, when the UE performs blind decoding for a specific control channel candidate, the UE regards each resource (e.g., REG) which belongs to the corresponding candidate, as a start point of PRB bundling. When different resources configuring the same candidate exist in a PRB bundling size from a start point, the UE may assume the same precoding as that the start point in the different resources. However, PRB bundling may be applied in the ascending order from the lowest PRB of corresponding CORESET, and the UE may assume that the resource processed by PRB bundling does not belong to another PRB bundling later.

Figure 10:
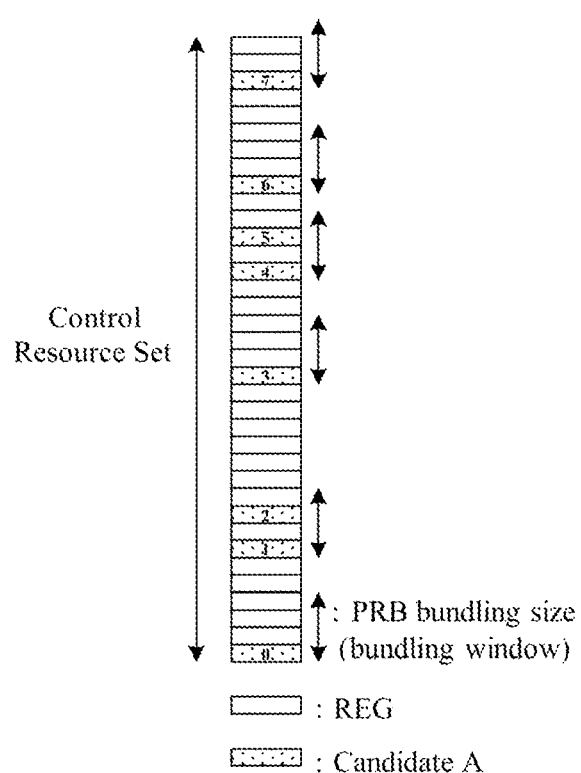
FIG. 10 is a diagram illustrating a control channel candidate on CORESET according to one embodiment of the present invention.

FIG. 10 is a diagram illustrating a control channel candidate on CORESET according to one embodiment of the present invention. In FIG. 10, it is assumed that REGs configuring a control channel candidate A are distributively arranged in CORESET. Also, it is assumed that 8 REGs configure one control channel candidate and a PRB bundling size is 4. The PRB bundling size may be referred to as a PRB bundling window.

If this embodiment is applied to FIG. 10, the UE applies the PRB bundling window to REG0 first arranged in the lowest PRB of CORESET in the ascending order. At this time, since there is no REG PRB-bundled with REG0, the UE may perform channel estimation for REG0 alone. Afterwards, if the UE applies a bundling window to REG1, it is noted that the UE may assume the same precoding for REG1 and REG2. Since REG2 belongs to the same PRB bundle as that of REG1, the UE may later apply the bundling window to REG3. In the same way, the UE may devise REG set, which may assume PRB bundling, from REGs which belong to the control channel candidate A. Consequently, the UE may apply PRB bundling to each of {REG1, REG2} and {REG4, REG5}, and may perform channel estimation for the other REGs independently.

(iii) PRB bundling may be applied from the lowest PRB within the entire CORESET.

(iv) PRB bundling may be applied from the lowest PRB within the entire UE-Specific bandwidth.

(v) PRB bundling may be applied from the lowest PRB within the entire system bandwidth.

Resources for Interference Measurement on Control Region

Interference measurement in the control channel may be used for measurement of quality (e.g., SINR) of the control channel as well as CSI measurement.

As one of a method for measuring interference in the control channel, it may be considered that the UE uses DMRS for control channel demodulation. However, since the DMRS is transmitted to only a region to which actual control information is transmitted, it is not appropriate to use the DMRS for evaluation of overall performance for the control region.

Therefore, it is suggested to measure interference of the control region through one or combination of the following methods.

(1) Wideband RS (or CSI-RS)

The network may signal, to the UE, that a wideband RS is transmitted to a specific CORESET or from a specific resource region. The specific resource region may correspond to combination of frequency resources and a set of slots and/or symbols, for example.

The wideband RS may be configured by cell-common sequence or UE group-common sequence. Also, in order to obtain transmit diversity gain, the UE may assume that the same precoding has been applied to a specific unit resource (e.g., REG bundle size in the frequency domain) within a bandwidth to which the wideband RS is transmitted. To this end, the network may signal information as to whether precoder cycling has been applied and precoder cycling information. The precoder cycling information may include at least one of REG bundling size, a bundle type (e.g., time/frequency) in a region to which the wideband RS is transmitted, and a bundling start position.

If the wideband RS is transmitted in a unit of CORESET, Wideband RS Configuration may be included in CORESET Configuration. The Wideband RS Configuration, for example, may include at least one of Wideband RS pattern, Wideband RS density, REG bundle size for the Wideband RS, symbol(s) including the Wideband RS, and Wideband RS periodicity.

Alternatively, resource information to which Wideband RS Configuration and Wideband RS are applied may be indicated through higher layer signaling such as RRC signaling (regarding CORESET or regardless of CORESET).

If a transmission region of the Wideband RS and CORESET which uses the DMRS are overlapped with each other, the UE may assume that the Wideband RS is prior to the DMRS, or RS to be assumed by the UE in the corresponding region may be indicated by the network.

For the Wideband RS, it is required to define signaling overhead and CORESET overlap handling. Also, if the Wideband RS is used, since interference is measured by channel estimation, etc., complexity of the UE may be increased.

To overcome this drawback, it may be considered that the UE measures interference in the corresponding region without additional process such as channel estimation of zero-power resources. The following suggests a method for configuring zero-power resources. Methods suggested below may be applied to only PDCCH resources transmitted to a specific UE, or the UE may assume that resources for interference measurement are always valid in the resource region to which zero-power configuration is applied, regardless of the presence of PDCCH. In view of interference measurement, the latter case is more preferable.

(2) Zero-Power RS Port

If a plurality of RS ports exist in the control region, the network may designate a specific port as Zero-Power RS.

For example, one of DMRS ports of the control region may be reused for Zero-Power RS.

Zero-Power RS Configuration may be included in CORESET Configuration, and Zero-Power RS Configuration may indicate a port configured as Zero-Power RS within CORESET. Also, the network may configure Zero-Power RS in only a partial frequency or time domain (for example, specific symbol) of CORESET (for a specific port or all ports).

As another method, in order that the UE performs interference measurement in a region larger than CORESET region, a time/frequency domain to which Zero-Power RS is applied may be indicated through higher layer signaling such as RRC signaling.

The Zero-Power RS port may be indicated by a pattern. For example, a pattern of an interference measurement resource may be signaled using RS pattern and port allocation defined for CORESET. For example, if 1 or 2-port RS is defined for the control channel, a port index may be used to indicate that Zero-Power resource for interference measurement is configured in a specific port of patterns for the 2-port RS.

Also, if different CORESETs have different RS configurations (e.g., the number of ports, RS pattern, etc.), the network may additionally signal RS configuration of corresponding CORESET on which Zero-Power RS is configured based.

Although multiple RS ports are defined for the control channel, if a multiplexing scheme is CDM or SDM, Zero-Power RS Configuration using a port may be impossible. In this case, it may be preferable that the network configures Zero-Power resources in RE to which control information is transmitted, as described later.

Also, a method for performing interference measurement is available using a specific RS port. This is similar to the wideband RS suggested as above but may be different from the wideband RS in that RS designated as DMRS is used. If the wideband RS is used, the UE may use DFT based channel estimation, and if the DMRS is used, the UE may measure interference by estimating a channel in a unit of RB or bundle size. To this end, the network may command the UE to perform interference measurement by using a specific DMRS port. Additionally, information as to application of precoder cycling and application resource information of precoder cycling may be included in configuration for the corresponding RS port. In this way, if the UE performs interference measurement using the DMRS port, it is advantageous that interference measurement is available even in RS multiplexing scheme such as CDM and SDM.

(3) Zero Power RS RE

If only a single RS port is supported in the control channel, some of resources into which the corresponding RS port is mapped may be designated as the Zero-Power resource.

For example, if a single RS port of the control channel is mapped into three REs per REG, the network may configure one of three REs or a plurality of REs as the Zero-Power resource.

Likewise, Zero-Power RS RE may be signaled by being included in CORESET Configuration. The Zero-Power RS may be applied to only a portion of CORESET resources. Alternatively, the network may configure the Zero-Power resource for specific CORESET(s) or a region larger than or smaller than CORESET.

In the same manner as the Zero-Power RS port, this may be interpreted as a scheme for indicating a pattern of the Zero-Power resource.

The UE may perform RS related operation such as channel estimation by using the other REs except resources configured as Zero-Power RS RE among REs into which the RS is mapped. The UE may assume that RS sequence is punctured or rate matched for the Zero-Power RS RE in view of RS sequence.

(4) Zero-Power Data RE

Data in this example means control information data (e.g., NR PDCCH) not user data (e.g., NR PDSCH). That is, Zero-Power data RE means that Zero-Power resource for interference measurement is configured in a region of the control region, into which control information except RS is mapped.

Similarly, information on Zero-Power date RE may be indicated to the UE by being included in CORESET Configuration or using separate higher layer signaling.

Resource granularity: a resource designated as Zero-Power date RE may be defined in RE level, REG level, REG-bundle level, CCE level, or Candidate level as below. In the followings (i)~(iii), time/frequency resources to which the Zero-Power resource is applied may be included in CORESET Configuration or higher layer signaling.

(i) RE level: a Zero-Power resource of RE level may be signaled in a pattern type. For example, the network may define a pattern in which Zero-Power RE may be configured within a specific resource unit (e.g., REG). If the Zero-Power resource of RE level is configured within CORESET or for some of the CORESET resource, the UE may assume that the control channel is rate matched or punctured in RE in which the Zero-Power resource is configured.

(ii) REG level (or REG-bundle level): the Zero-Power resource may be configured in a unit of REG/REG-bundle. If the Zero-Power resource of REG level/REG-bundle is configured for the UE, the UE may perform REG indexing except the corresponding REG/REG-bundle within CORESET.

(iii) CCE level (or Candidate level): resource granularity of (i) RE level or (ii) REG (bundle) level may flexibly configure the Zero-Power resource but increase signaling overhead. In order to reduce signaling overhead, Zero-Power resource Configuration of CCE/Candidate level may be considered. In CORESET to which interleaving is applied, since one candidate is transmitted by being distributed in CORESET, Zero-Power resource configuration of Candidate level may be favorable if interference is intended to be uniformly measured within CORESET.

Figure 11:
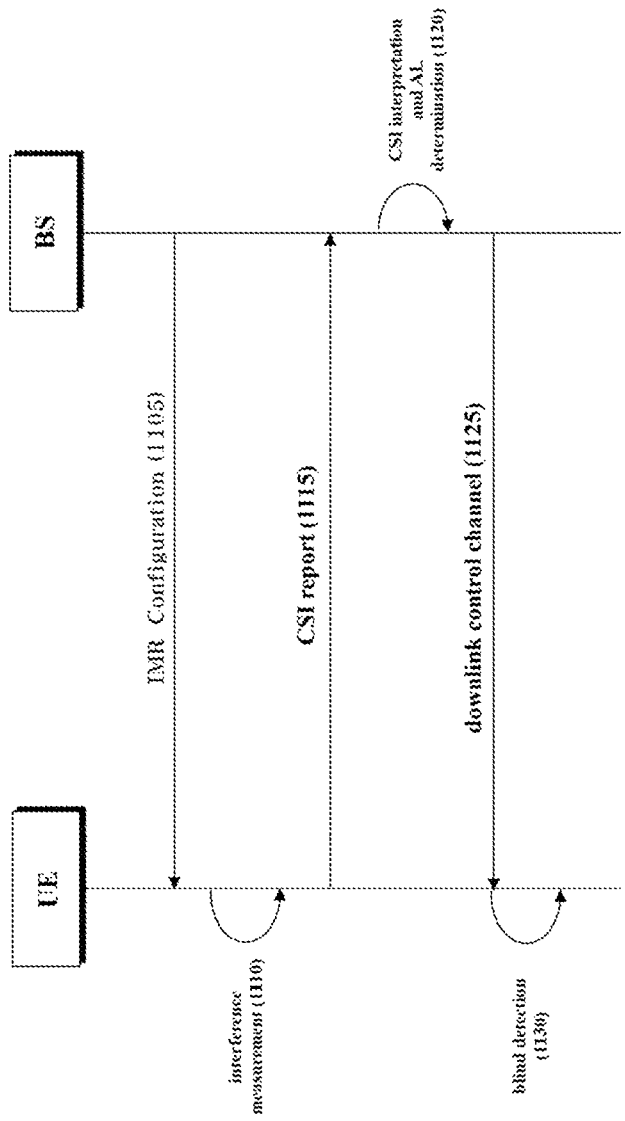
FIG. 11 is a flow chart illustrating a method for reporting CSI according to one embodiment of the present invention.

FIG. 11 is a flow chart illustrating a method for reporting CSI according to one embodiment of the present invention. FIG. 11 illustrates an exemplary embodiment carried out using some of the aforementioned description, and the present invention is not limited to the embodiment of FIG. 11. Repeated description of the aforementioned description may be omitted.

Referring to FIG. 11, the UE may receive configuration information on IMR of the control region from the base station (1105). IMR may be set to RE (resource element) level, REG (RE group) level, CCE level or control channel candidate level.

The UE measures interference through IMR (interference measurement resource) configured in the control region (1110).

The UE reports CSI for the control region to the base station based on the result of interference measurement (1115).

For example, CSI may be acquired using the result of interference measurement through IMR and the result of signal measurement (not shown) through RS. The RS may be a CSI-RS. The CSI-RS may be received from the control region or the data region. If the UE measures the CSI-RS in the data region, information on the CSI-RS of the base station, which is configured in the data region, may be shared together with a neighboring base station. Interference coordination corresponding to the control region on the resource of the CSI-RS configured in the data region may be performed by the base station and its neighboring base station.

CSI on the control region may include information on quality of a downlink control channel configured through at least one CCE (control channel element) aggregation. The information on quality of the downlink control channel may include information on at least one CCE aggregation level preferred by the UE to receive the downlink control channel.

The UE may determine its preferred at least one CCE aggregation level by assuming that a rank of the downlink control channel is fixed to 1.

The CSI on the control region may further include information on a group PMIs (precoding matrix indexes) preferred by the UE. The UE may determine the group of PMIs preferred by itself by assuming that the rank of the downlink control channel is fixed to 1.

The UE may report CSI per at least one control resource set (CORESET) configured on the control region or report CSI per search space set.

The base station may interpret the CSI received from the UE (1120). For example, the base station may interpret at least one CCE aggregation level preferred by the UE and the group of the PMIs preferred by the UE by assuming that the rank of the downlink control channel is fixed to 1.

Also, the base station may determine the CCE aggregation level of the downlink control channel based on the interpreted CSI. For example, the base station may determine the CCE aggregation level of the downlink control channel in accordance with at least one CCE aggregation level received through the CSI.

The base station may transmit the downlink control channel to the UE (1125). If the downlink control channel which is transmitted is overlapped with IMR, the base station may perform rate matching or puncturing of the control information, which is carried by the downlink control channel which is transmitted, for IMR.

The UE may perform blind detection for candidates of the downlink control channel (1130). At least one of CCE aggregation levels for blind detection and the number of candidates corresponding to the respective CCE aggregation levels may be determined depending on at least one CCE aggregation level reported by the UE through CSI. The UE may omit blind detection for the candidate overlapped with IMR or assume that the control information is rate matched or punctured for IMR.

Figure 12:
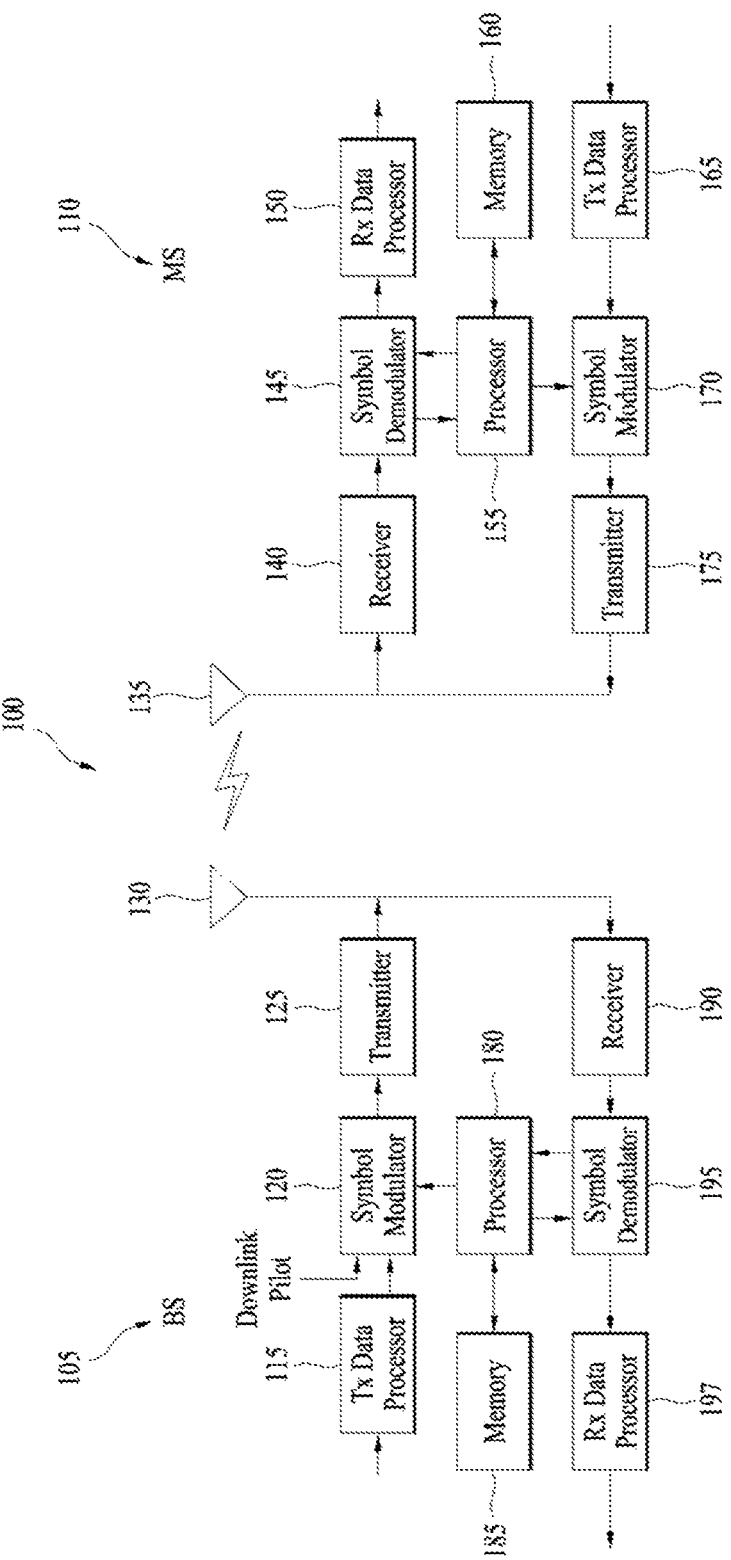
FIG. 12 is a block diagram illustrating a user equipment and a base station according to an embodiment of the present disclosure.

FIG. 12 is a block diagram illustrating the configuration of a BS 105 and a UE 110 in a wireless communication system 100 according to an embodiment of the present disclosure.

While one BS 105 and one UE 110 are shown in the drawing to schematically represent the wireless communication system 100, the wireless communication system 100 may include at least one BS and/or at least one UE.

The BS 105 may include a transmitted (Tx) data processor 115, a symbol modulator 120, a transmitter 125, a transceiving antenna 130, a processor 180, a memory 185, a receiver 190, a symbol demodulator 195 and a received data processor 197. And, the UE 110 may include a transmitted (Tx) data processor 165, a symbol modulator 170, a transmitter 175, a transceiving antenna 135, a processor 155, a memory 160, a receiver 140, a symbol demodulator 155 and a received data processor 150. Although the BS 105/UE 110 are illustrated as including one antenna 130, 135, each of the BS 105 and the UE 110 includes a plurality of antennas. Therefore, each of the BS 105 and the UE 110 of the present disclosure supports a multiple input multiple output (MIMO) system. And, the BS 105 according to the present disclosure may support both the single user-MIMO (SU-MIMO) system and the multi user-MIMO (MU-MIMO) system.

In downlink, the transmission data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In this operation, each of the transmitted symbols may include the data symbol, the pilot symbol or a signal value of zero. In each symbol duration, pilot symbols may be contiguously transmitted. In this operation, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel. Subsequently, the downlink signal is transmitted to the UE via the antenna 130.

In the configuration of the UE 110, the receiving antenna 135 receives the downlink signal from the BS and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmission data processor 115 in the BS 105, respectively.

In the UE 110 on uplink, the transmission data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an uplink signal. This uplink signal is then transmitted to the BS 105 via the antenna 135.

In the BS 105, the uplink signal is received from the UE 110 via the antenna 130. The receiver 190 processes the received uplink signal and then obtains samples. Subsequently, the symbol demodulator 195 processes the samples and then provides pilot symbols received in uplink and a data symbol estimated value. The received data processor 197 processes the data symbol estimated value and then reconstructs the traffic data transmitted from the UE 110.

The processor 155/180 of the UE 110/BS 105 directs operations (e.g., control, adjustment, management, etc.) of the UE 110/BS 105. The processor 155/180 may be connected to the memory unit 160, 185 configured to store program codes and data. The memory 160, 185 is connected to the processor 155, 180 to store operating systems, applications and general files.

The processor 155, 180 may be called one of a controller, a microcontroller, a microprocessor, a microcomputer and the like. And, the processor 155, 180 may be implemented using hardware, firmware, software and/or any combinations thereof. In the implementation by hardware, the processor 155, 180 may be provided with such a device configured to implement the present disclosure as application specific integrated circuits (ASICs), digital signal processors (DSPs), digital signal processing devices (DSPDs), programmable logic devices (PLDs), field programmable gate arrays (FPGAs), and the like.

In case of implementing the embodiments of the present disclosure using firmware or software, the firmware or software may be configured to include modules, procedures, and/or functions for performing the above-explained functions or operations of the present disclosure. And, the firmware or software configured to implement the present disclosure is loaded in the processor 155, 180 or stored in the memory 160, 185 so as to be driven by the processor 155, 180.

Layers of a radio protocol between a UE/BS and a wireless communication system (network) may be classified into 1st layer L1, 2nd layer L2 and 3rd layer L3 based on 3 lower layers of open system interconnection (OSI) model well known to communication systems. A physical layer belongs to the 1st layer and provides an information transfer service via a physical channel. Radio resource control (RRC) layer belongs to the 3rd layer and provides control radio resourced between UE and network. A UE and a BS may exchange RRC messages with each other through a wireless communication network and RRC layers.

The above-mentioned embodiments correspond to combinations of elements and features of the present disclosure in prescribed forms. And, it is able to consider that the respective elements or features are selective unless they are explicitly mentioned. Each of the elements or features can be implemented in a form failing to be combined with other elements or features. Moreover, it is able to implement an embodiment of the present disclosure by combining elements and/or features together in part. A sequence of operations explained for each embodiment of the present disclosure can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

While the present disclosure has been described and illustrated herein with reference to the preferred embodiments thereof, it will be apparent to those skilled in the art that various modifications and variations can be made therein without departing from the spirit and scope of the invention. Thus, it is intended that the present disclosure covers the modifications and variations of this invention that come within the scope of the appended claims and their equivalents.

The embodiments of the present invention mentioned in the foregoing description are applicable to various kinds of mobile communication systems.

What is claimed is:

1. A method for reporting channel state information (CSI) by a user equipment (UE) in a wireless communication system, the method comprising:
   receiving configuration information for an interference measurement resource (IMR);
   performing interference measurement through the IMR based on the configuration information; and
   reporting, to a base station, CSI based on the result of the interference measurement,
   wherein the IMR is configured in a control region, and
   wherein the CSI is reported for the control region based on the result of the interference measurement of a CSI reference signal (RS) configured in a downlink control channel on a fixed rank.

2. The method of claim 1, wherein the rank of the downlink control channel is fixed to 1.

3. The method of claim 2, wherein the CSI reported for the control region includes information regarding a group of PMIs (precoding matrix indexes) preferred by the UE.

4. The method of claim 3, wherein the group of PMIs is determined based on one or more PMIs in which a received signal-to-interference-and-noise-ratio (SINR) is expected to exceed a predetermined threshold.

5. The method of claim 3, wherein the CSI reported for the control region further includes information regarding a channel quality indicator (CQI).

6. The method of claim 1, wherein based on a plurality of ports being configured for the CSI RS of the downlink control channel, some ports among the plurality of ports are used for the interference measurement.

7. The method of claim 1,
   wherein the IMR is configured in a resource element (RE) level, an RE group (REG) level, a control channel element (CCE) level or a control channel candidate level.

8. The method of claim 1, further comprising performing blind detection for candidates of the downlink control channel, and
   wherein at least one of control channel element (CCE) aggregation levels for blind detection and the number of candidates corresponding to each CCE aggregation level is determined in accordance with at least one CCE aggregation level reported by the UE through the CSI.

9. The method of claim 8, wherein the UE omits blind detection for a candidate overlapped with the IMR, or assumes that control information is rate matched or punctured for the IMR.

10. A user equipment (UE) for reporting channel state information (CSI) in a wireless communication system, the UE comprising:
    a receiver;

a transmitter;
a processor; and
a memory storing instructions that, based on being executed by the processor, perform operations comprising:
receiving configuration information for an interference measurement resource (IMR);
performing interference measurement through the IMR based on the configuration information, and
reporting, to a base station, CSI based on the result of the interference measurement,
wherein the IMR is configured in a control region, and
wherein the CSI is reported for the control region based on the result of the interference measurement of a CSI reference signal (RS) configured in a downlink control channel on a fixed rank.

11. A method for receiving channel state information (CSI) by a base station in a wireless communication system, the method comprising:
transmitting configuration information for an interference measurement resource (IMR); and
receiving, from a UE, CSI which is generated based on the IMR,
wherein the IMR is configured in a control region, and
wherein the CSI is reported for the control region based on the result of the interference measurement of a CSI reference signal (RS) configured in a downlink control channel on a fixed rank.

12. The method of claim 11, wherein the rank of the downlink control channel is fixed to 1.

13. The method of claim 12, wherein the CSI reported for the control region includes information regarding a group of PMIs (precoding matrix indexes) preferred by the UE.

14. The method of claim 13, wherein the group of PMIs is determined, by the UE, based on one or more PMIs in which a received signal-to-interference-and-noise-ratio (SINR) is expected to exceed a predetermined threshold.

15. The method of claim 13, wherein the CSI reported for the control region further includes information regarding a channel quality indicator (CQI).

16. The method of claim 11, wherein based on a plurality of ports being configured for the CSI RS of the downlink control channel, some ports among the plurality of ports are used for the interference measurement.

17. The method of claim 11, wherein the IMR is configured in a resource element (RE) level, an RE group (REG) level, a control channel element (CCE) level or a control channel candidate level.

* * * * *